United States Patent
Casilli

(10) Patent No.: US 10,129,046 B1
(45) Date of Patent: Nov. 13, 2018

(54) FAULT TOLERANT SERVICES FOR INTEGRATED BUILDING AUTOMATION SYSTEMS

(71) Applicant: Siemens Industry, Inc., Alpharetta, GA (US)

(72) Inventor: Chris Casilli, Morriston, FL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 15/698,178

(22) Filed: Sep. 7, 2017

(51) Int. Cl.
*H04L 12/28* (2006.01)
*H04L 29/08* (2006.01)

(52) U.S. Cl.
CPC ........ *H04L 12/2814* (2013.01); *H04L 12/281* (2013.01); *H04L 12/2809* (2013.01); *H04L 12/2821* (2013.01); *H04L 67/125* (2013.01)

(58) Field of Classification Search
CPC ..... H04L 12/2814; H04L 12/09; H04L 12/01; H04L 12/21; H04L 67/125
See application file for complete search history.

(56) References Cited

U.S. PATENT DOCUMENTS

2010/0281387 A1* 11/2010 Holland ................ G05B 15/02
715/735

OTHER PUBLICATIONS

Armstrong, Joe, "Making Reliable Distributed Systems in the Presence of Software Errors", Royal Institute of Technology, Stockholm, Sweden, Dec. 2003, 295 pages.

* cited by examiner

*Primary Examiner* — Leon Flores

(57) ABSTRACT

A service accesses one or more building automation system's elements directly to collect data and provides the data to data consumers.

15 Claims, 9 Drawing Sheets

FAULT TOLERANT SERVICES FOR INTEGRATED BUILDING AUTOMATION SYSTEMS

TECHNICAL FIELD

The present invention relates generally to building automation system and more particularly to the collection of data from building automation systems.

BACKGROUND

Most modern buildings are built with security systems, emergency systems, heating, ventilating, and air conditioning (HVAC) systems, all of which have many sensors, fans, values, and actuators. These systems together are commonly referred to as a building automation system (BAS). Many of these devices are controlled by microcontroller or microprocessor located in field panels dispersed throughout a building or even a campus. The elements that make up the BAS are typically called points, panels, and equipment.

Equipment, panels, and points in a building automation system as shown in FIG. 1, may include legacy equipment from earlier attempts at automation and have limited resources and capabilities; they may even be from different manufactures. A BAS 13 having legacy equipment typically has a manager 14 in direct communication with legacy equipment 15, panel 16, and point 17. External devices, such as device 11 and device 12 may get data directly from the manager 14.

Turning to FIG. 2, a diagram 20 having multiple data consumers 24 and 26 requesting data from BAS 13 is depicted. A BAS having legacy building automation equipment, panels, and points, such as BAS 13 often have limited communication capabilities that can fail under stress. These limitations occur due to limited processing power, bandwidth limitations, and memory/buffer limitations. Furthermore, World Wide Web and even Internet access may be lacking in legacy devices in the BAS 13. Another problem that exists with BASs is equipment often is dedicated to an installation and not shared.

In view of the foregoing, there is an ongoing need for systems, apparatuses and methods for gathering data from one or more BAS that have legacy devices and/or limiting hardware and then making that data available to data consumers in a fault tolerant system that does not stress a BAS.

SUMMARY

Multiple services for integrated building (MSIB) server communicates directly with equipment, panels, and points of a BAS without being dedicated to the BAS in a fault tolerant manner. The MSIR starts a virtual node manager that manages a plurality of fault tolerant virtual nodes that are enabled with the capabilities to communicate with the equipment, panels, and points of a BAS. Data consumers are then able to access the MSIB rather than the BAS directly using non-proprietary or standard interfaces. Such communication reduces the loading of the BAS's gateway or management device that are integrated in the BAS. Furthermore, the collected data at the MSIB is available via modern approaches, applications, and protocols.

Other devices, apparatus, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, an approach is described for a MSIB in communication with one or more BASs is provided where a MSIB communicates directly with equipment, panels, and points.

Figure 1:
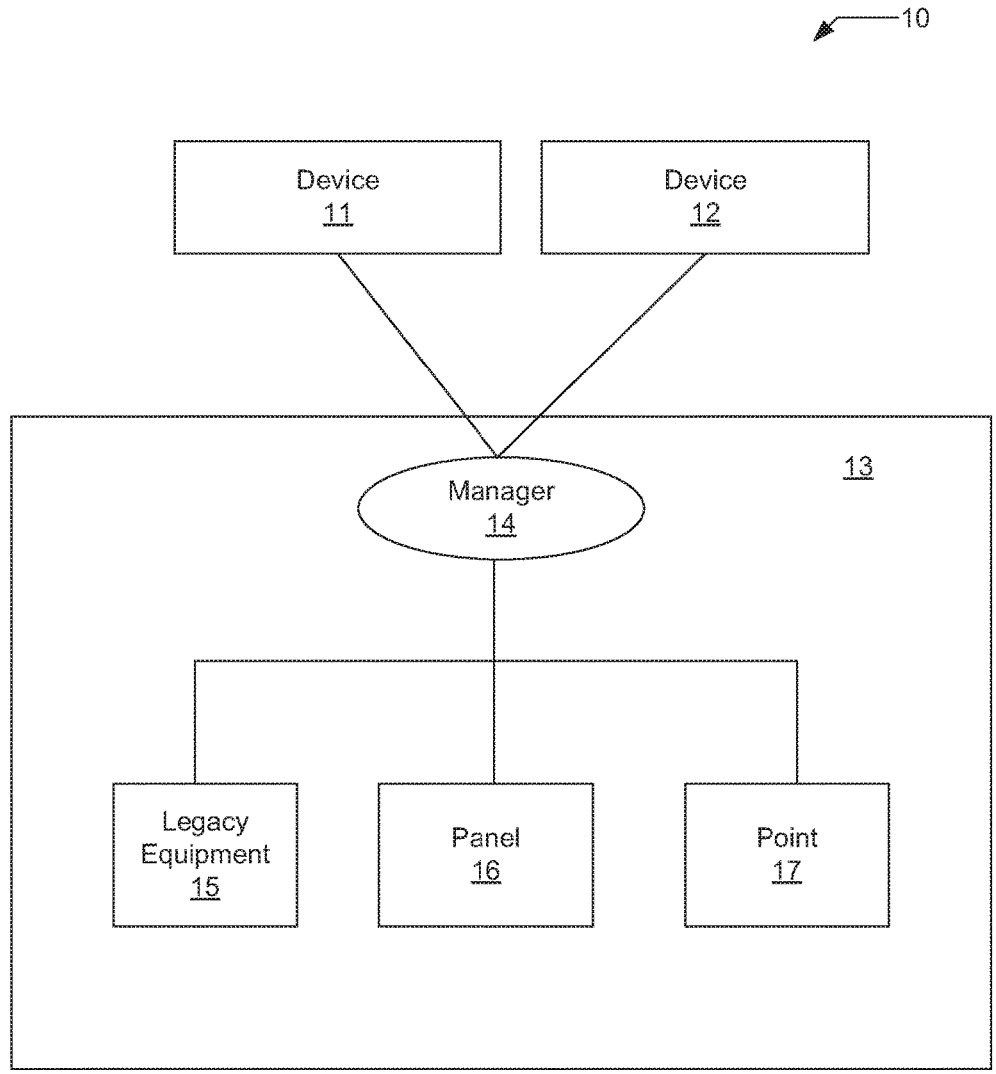
FIG. 1 is an illustration of a legacy building automation system (BAS).
Figure 2:
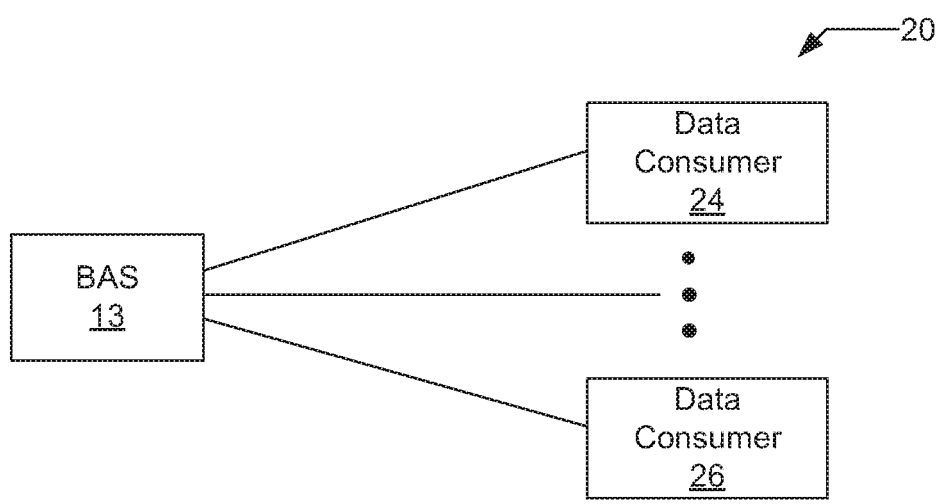
FIG. 2 is an illustration of a prior art approach to gathering data from the legacy BAS of FIG. 1.
Figure 3:
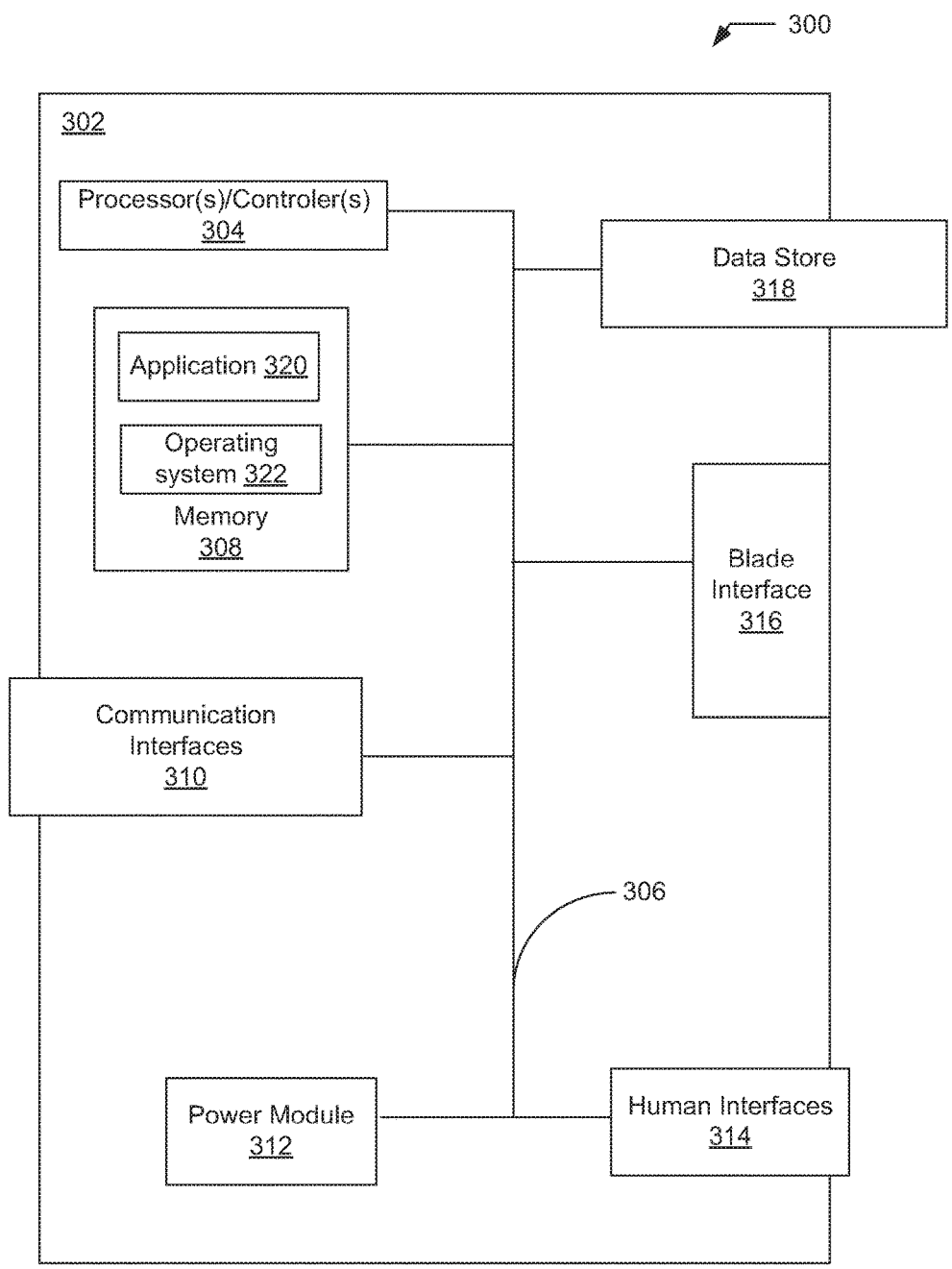
FIG. 3 is a diagram of a MSIB in accordance with an example implementation.

Turning to FIG. 3, a diagram 300 of a MSIB 302 in accordance with an example implementation is depicted. One or more processors or controllers 304 may be present in the MSIB 302. In other implementations, multiple processing cores may also be present in each the processors or controller 304. One or more electrical buses 306 (i.e. data and address) may couple the processor 304 with a memory 308, communication interfaces 310, power module 312, human interfaces 314, blade interface 316, and data store 318.

The memory 308 may be divided between an application memory 320 and operating system 322. The operating system manages the operation of the server and is stored in the operating system memory 322 and instructions for the operation of the MSIB 302 are stored in the application memory 320. In other implementations, the operating system memory 322 may be implemented as read only memory (ROM) or erasable programmable memory (EPROM) and the application memory 320 in a re-writable random access memory.

The communication interfaces 310 provide the different physical connections and drivers to interface the hardware with software needed to communicate with other devices, such as serial, internet, token ring, Bluetooth, and wireless communication. The power module 312 is a power supply that supplies direct current to the different electrical components of the MSIB 302 by converting alternating current to direct current or via batteries. The human interfaces 314 enable devices such as a keyboard, a mouse and a display to be connected to the MSIB 302. The blade interface 316 enable redundant MSIBs to communicate and in fault tolerant environment over an external bus that enables one of the MSIBs to take over processing if the other fails or becomes inoperative.

The data store 318 may be internal data storage, external data storage, or a combination of internal and external storage. Examples of internal data storage include hard disks, compact disk (CD), SDRAM DISKs, and floppy disk. Examples of external data storage include all the previous examples being attached externally to the MSIB 302. Network storage including cloud storage and network attached storage (NAS) are external storage, but may be connected to the MSIB 302 via the communication interfaces 310.

Figure 4:
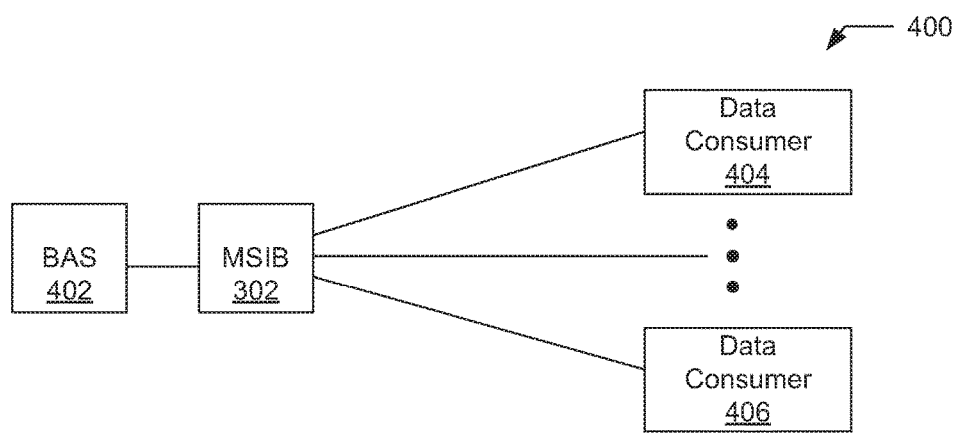
FIG. 4 is a diagram of the MSIB of FIG. 3 in communication with BAS and data consumers in accordance with an example implementation.

In FIG. 4, a diagram 400 of the MSIB 302 of FIG. 3 in communication with BAS 402 and data consumers including data consumers 404 and 406 in accordance with an example implementation are depicted. The MSIB 302 is able to communicate directly with the equipment, panels, and points that make up the BAS 402 in a manner that does not over load the BAS's 402 devices. The MSIB 302 is also able to provide the different protocols needed to communicate with the BAS's 402 devices as some of the protocols to older devices use proprietary or non-stand protocols. The MSIB 302 also is more robust and able to simultaneously have multiple communication sessions occurring and respond to multiple data consumers, such as 404 and 406 at the same time without adversely affecting the operation of the BAS. Because the data consumers do not directly communicate with the BAS 402, the BAS 402 is shielded from being overloaded by the data consumers' data requests and bottle necks that can occur accessing a BAS via a gateway.

Figure 5:
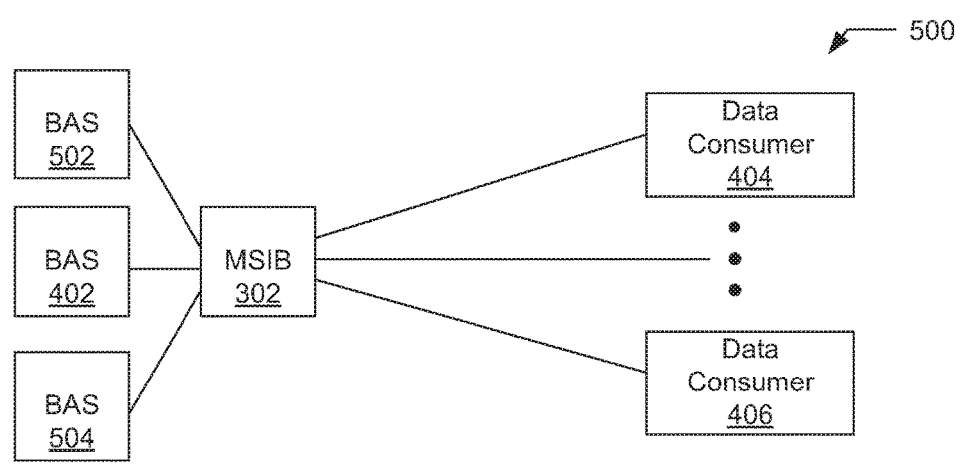
FIG. 5 is a diagram of the MSIB of FIG. 3 in communication with multiple BASs and data consumers in accordance with an example implementation of the invention.

Turning to FIG. 5, a diagram 500 of the MSIB 302 of FIG. 3 in communication with multiple BASs 402, 502, and 504 and data consumers 404-406 in accordance with an example implementation of the invention. The MSIB 302 may communicate with multiple BASs, more particular the equipment, panels and points of multiple BASs, such as BAS 402, 502 and 504. The BASs may be geographically dispersed, such as all of a manufacturer's factories in the United States. Data from the multiple BASs may then be accessed by multiple data consumers 404-406.

Figure 6:
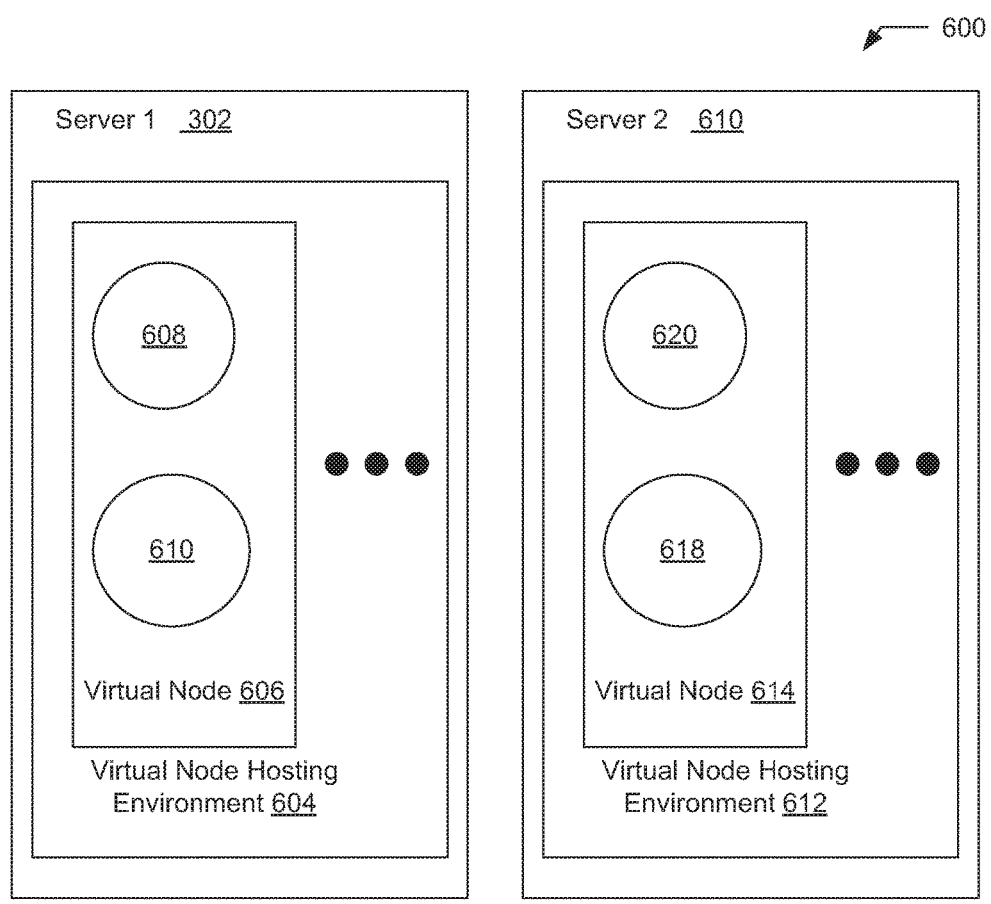
FIG. 6 is a diagram of multiple MSIB servers hosting virtual nodes in accordance with an example implementation of the invention.

In FIG. 6, a diagram 600 of multiple MSIB servers 302 and 610 hosting virtual nodes 606 and 614 is depicted in accordance with an example implementation of the invention. MSIB server 302 is depicted with virtual node hosting environment 604 and a plurality of virtual nodes, including virtual node 606 with services 608 and 610. Each virtual node in the virtual node hosting environment 604 requires server resources; this is a limit to how many virtual nodes can be supported on a server, such as server 302. But, in order to implement larger numbers of virtual nodes, additional MSIB servers may be employed, such as MSIB server 610. MSIB server 610 has a virtual node hosting environment 612 with a plurality of virtual nodes including virtual node 614 with services 618 and 620. If even more virtual nodes and/or redundancy of MSIB servers are required, then additional MSIB servers may be employed.

Figure 7:
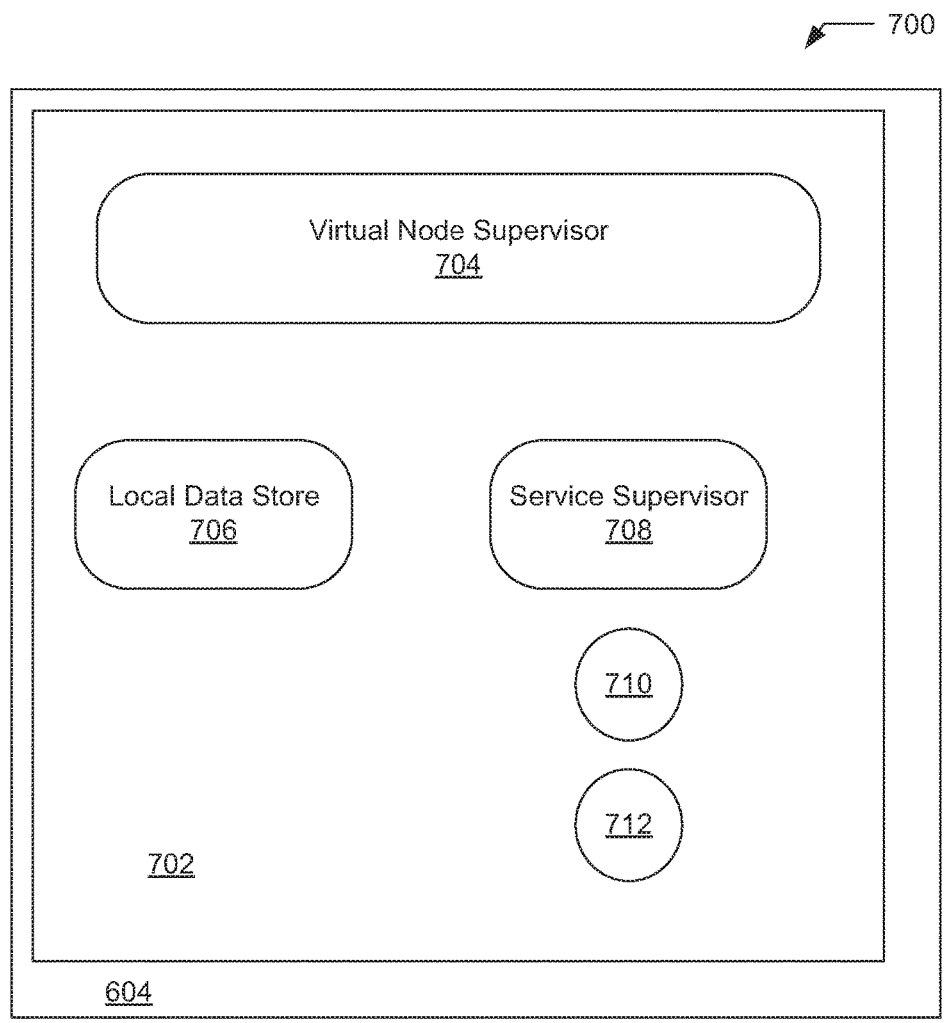
FIG. 7 is a diagram of a virtual node in the virtual node hosting environment of FIG. 6 in accordance with an example implementation.

Turning to FIG. 7, a diagram 700 of a virtual node 702 in a virtual node hosting environment 604 of FIG. 6 in accordance with an example implementation is depicted. Every virtual node 702 has a virtual node supervisor 704 that monitors the operation of that instance of the virtual node 702. Each virtual node 702 has a local data store 706 that exist for the duration of the existence of the virtual node 702 and used by other services, such as 710 and 712. The virtual node supervisor 704 enables communication with the virtual node environment 604 and other virtual nodes. The other services are supervised by the service supervisor 708. If a service ceases to operate properly or dies, the service supervisor 708 spawns a replacement service or otherwise restarts the service and cleans up resources. It is noted a required services (such as the virtual node supervisor 704 and service supervisor 708) can have a polling time and separation timer period for accessing elements of the BAS. Examples of services 710 and 712 are services for implementing specific protocols to access equipment, panels and points, collect periodic data from equipment, panels and points, monitor operational conditions of equipment, panels and points, to give but a few examples.

Figure 8:
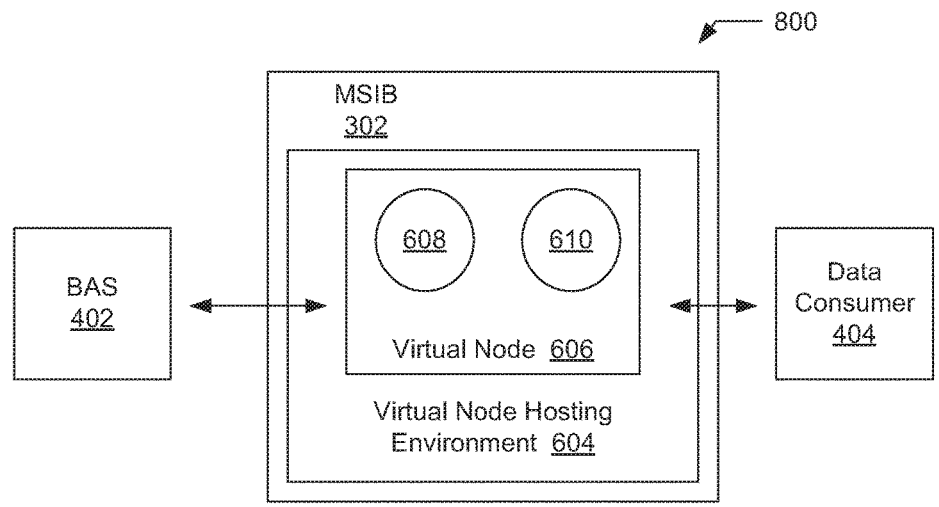
FIG. 8 is a diagram of the MSIB of FIG. 3 communicating with the BAS and data consumer of FIG. 4 in accordance with an example implementation.

In FIG. 8, a diagram 800 of the MSIB 302 of FIG. 3 communicating with the BAS 402 and data consumer 404 of FIG. 4 is depicted in accordance with an example implementation. The MSIB 302 executes a plurality of instructions implementing the virtual node hosting environment 604. The instructions implementing the virtual node hosting environment are preferably implemented in a language that supports development of distributed, fault-tolerant, highly available, non-stop applications, such as open source ERLANG programming language available at www.erlang.org or other similar object oriented programming language. Within the virtual node hosting environment 604, virtual nodes, such as virtual node 606, are configured to communicate with the equipment, panels, and points of BAS 402 and gather data. Within the virtual node 606 services required to operate the node, communicate with the BAS 402, store data collected from the BAS 402 are created and operated, such as service 608 and 610. It is noted that MSIB 302 in other implementations may exist in the cloud and be accessed via the internet, or in other implementations be implemented and accessed via VPN or other dedicated network connection (locally or remote).

Data consumer 404 requests or otherwise requires data from the BAS 402. Rather than communicate with the BAS 402 directly, data consumer 404 accesses the MSIB 302 and requests data stored at the MSIB 302 (or requests MSIB 302 to get the data) as shown in FIG. 8. It is noted that the virtual node 606 at the MSIB 302 is not managing the BAS 402, rather accessing equipment, panels, and points of BAS 402 and retrieving data from the BAS 402. Trend data is setup at the virtual node 606 and collected by the virtual node 606. Thus, an advantage is achieved by offloading data collection and communication from the BAS 402 gateway or managers.

Figure 9:
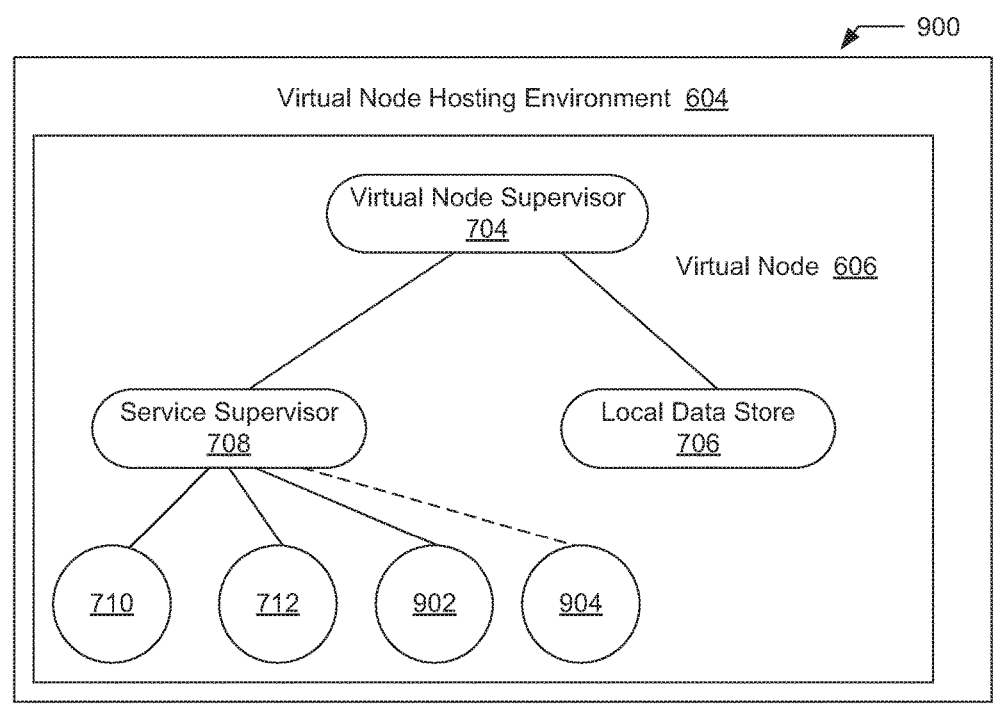
FIG. 9 is a diagram of the virtual node of FIG. 7 showing the restarting of a service by the service supervisor in accordance with an example implementation.

In FIG. 9, a diagram 900 of a virtual node 606 of FIG. 7 showing the restarting of a service 904 by the service supervisor 708 is depicted in accordance with an example implementation. The virtual node 606 has a virtual node supervisor service 704 that in turn creates a service supervisor 708 and local data store 708. The virtual node supervisor communicates with the virtual node hosting environment 604 and manages the operation of the virtual node 606 in isolation from the management and operation of other virtual nodes within the virtual node hosting environment 604. In the event of the virtual node 606 encounters an operational situation where it stops working or otherwise responding to the virtual node hosting environment 604, the virtual node hosting environment 604 shuts down the virtual node 606, releases the allocated resources and restarts the virtual node.

If the service supervisor 708 or local data store 706 encounters operational issues, the virtual node supervisor 704 can terminate the affected service and restart it. It is noted that every virtual node, such as virtual node 606 has at least a virtual node supervisor 704, service supervisor 708, and local data store 706 started when created in the virtual node hosting environment 604.

The service supervisor 708 creates and maintains services, such as services such as 710, 712, 902, and 904 that are required to communication and collect data from the equipment, panels, and points in a BAS, such as BAS 402. If a service, such as service 904 stops operating or otherwise generates faults detected by the service supervisor 708, the service is terminated, resources released, and restarted. Such actions occur without affecting the operation of the other services monitored and created under the service supervisor 708.

Figure 10:
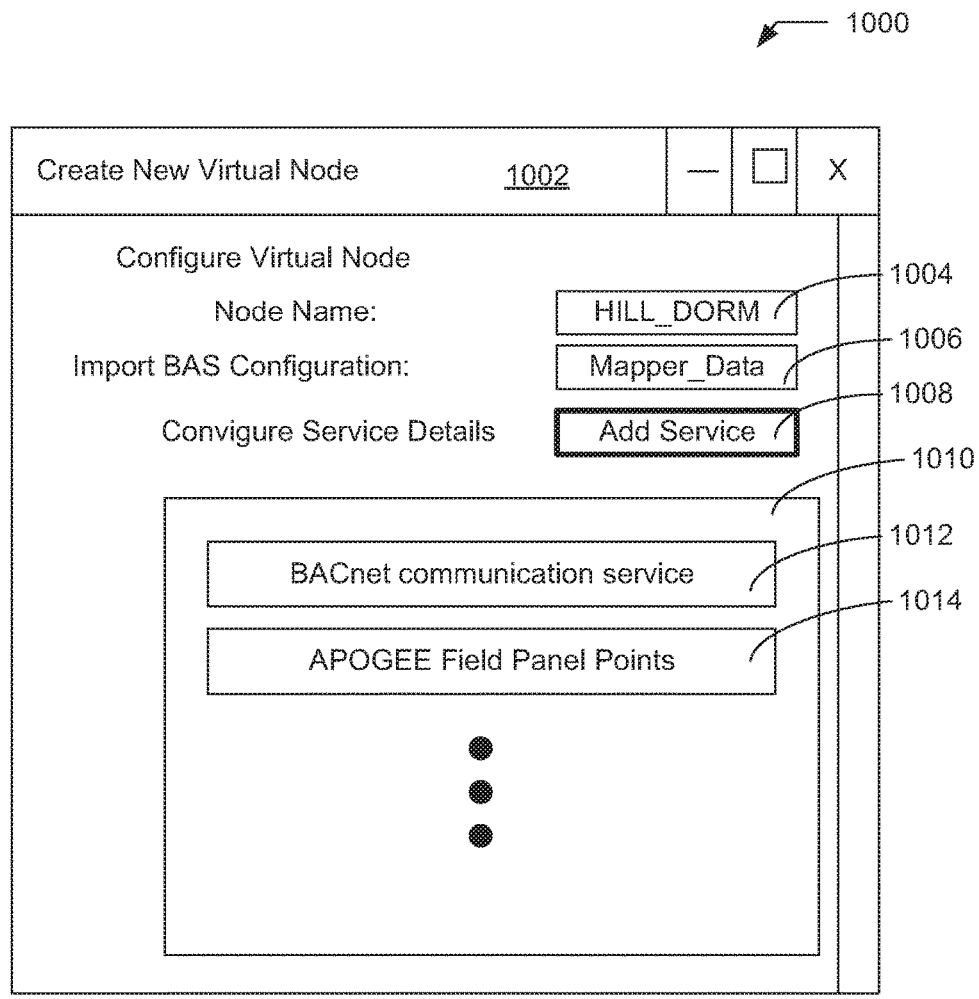
FIG. 10 is a drawing of a graphical user interface for creating virtual nodes in accordance with an example implementation of the invention.

Turning to FIG. 10, a drawing 1000 of a graphical user interface 1002 for creating virtual nodes in accordance with and example implementation of the invention. The graphical user interface 1002 may be accessed via a World Wide Web browser and displayed on a device such as a computer, tablet, or smartphone. In order to create a virtual node with the graphical user interface 1002 of the MSIB, a node name is entered in a text box 1004 "HILL_DORM." This is the name that the virtual node will be named in the MSIB 302. The configuration of the BAS "HILL_DORM" is known to the MSIB 302 by loading a configuration data file identified as "Mapper_Data" 1006 that has either been created for, by, or in response to the MSIB 302.

Using the "Mapper_data" (at least a partial list of elements that make up the BAS) that is loaded or otherwise accessed by the MSIB 300, services are created for the virtual node in addition to the required services. The "Add Service" button 1008 is selected and a drop down window is shown of possible services to be created. Once a service is selected a window may open for any required configuration data. Once configuration is complete, the service is listed in window 1010, such as BACnet communication services 1012 and APOGEE Field Panel Points 1014.

Figure 11:
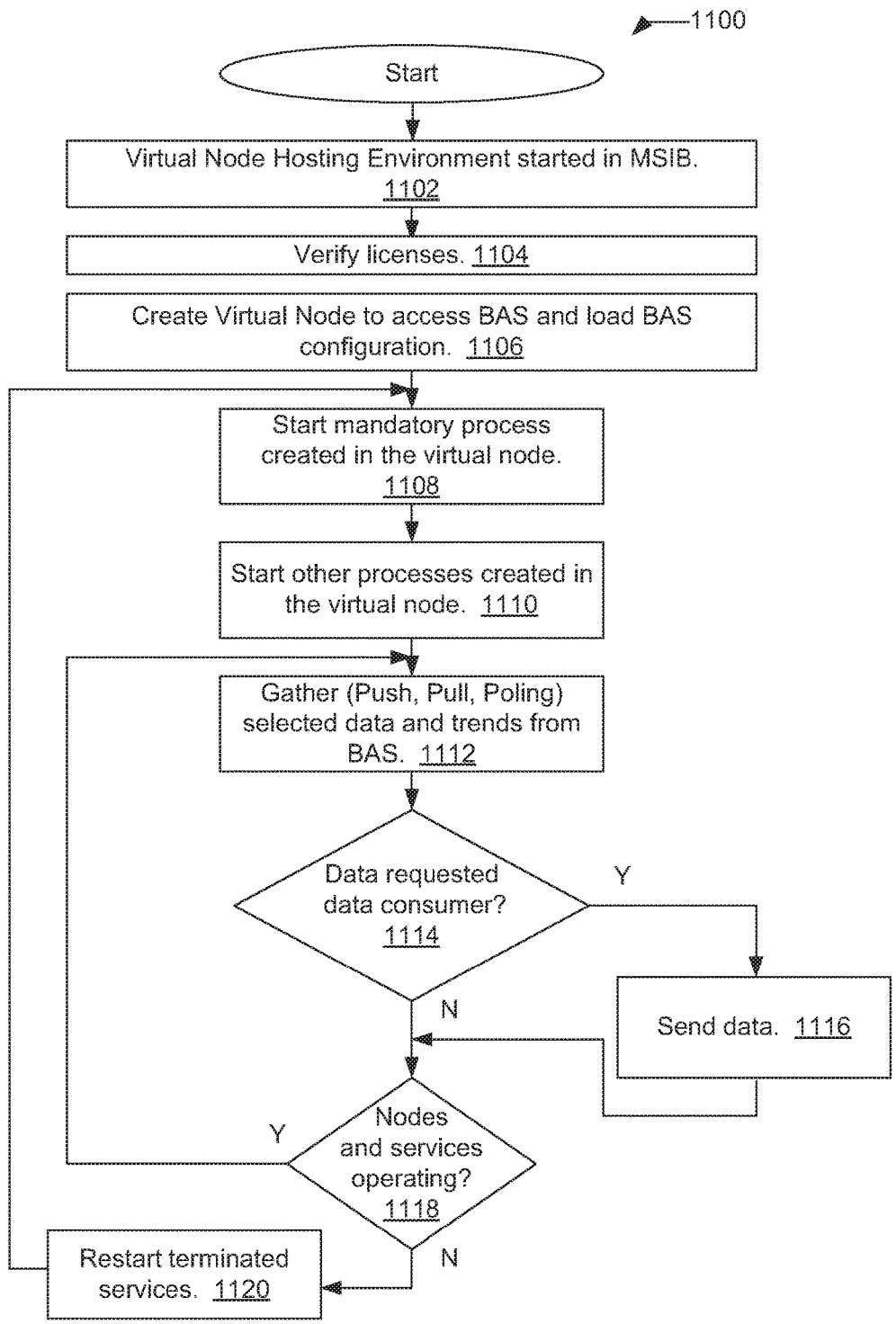
FIG. 11 is a flow diagram of the approach for implementing a MSIB device in accordance with an example implementation.

FIG. 11 is a flow diagram 1100 of the approach for implementing a MSIB 302 of FIG. 3 in accordance with an example implementation. The virtual node hosting environment 604 is started in the MSIB 302 in step 1102. The virtual node hosting environment 604 in the initialization of the supervising node accesses or otherwise reads at least a portion of a database of element information that may also include times for polling respective elements of the BAS. The application or device in the current example implementation has licensing verification in step 1104. The licensing may be by number of nodes supported, number of BASs supported, amount of data to be collected. The licensing information is in the form of a code that is provided with the system and entered by an administrator in the current example. In other implementations a physical device such as a fob may be employed. In yet other implementations, other operational parameters or number of elements (e.g., devices or points in the BAS to be accessed) may be licensed. Once the licensing has been verified in step 1104, a virtual node (e.g., 606 in FIG. 6 consistent with the structure of virtual node 700 in FIG. 7) is generated and/or started to access BAS 402 and the configuration database or files for BAS 402 are loaded (if needed) in step 1106.

A mandatory process (Virtual Node Supervisor 704, Service Supervisor 708, and Local Data Store 706 in the current example) of the virtual node is generated and or started in step 1108. Other processes that comprise one or more services 710, 712, 902, 904, 1012, and 1014 of the virtual node that are monitored or supervised by the service supervisor 708 are started in step 1110. In step 1112, data is gathered from the equipment, panels, and points of a BAS 402 by one or more of the services (such as 710, 712, and 902) in the virtual node 700. The data may be pushed to the virtual node from equipment, panels, and points of a BAS, pulled from equipment, panels, and points of a BAS, or otherwise collected from equipment, panels, and points of a BAS. The data in the current example is collected at pre-determined "polling intervals" and/or "separation time" between point requests within a polling cycle to avoid overburdening the BAS. In other implementations, different approaches for gathering data may be employed to avoid overloading the equipment, panels and points of a BAS. If data is requested by a data consumer in step 1114, then the data is sent to the data consumer in step 1116. The data that is sent to the data consumer 1114 does not affect the BAS as it is already stored or otherwise gathered at the MSIB 302. In other implementations, approaches to servicing data consumer's data request may be implemented in order to avoid bottlenecks or overloading of the MSIB 302. In step 118, any services that require restarting are restarted in step 1120.

It will be understood, and is appreciated by persons skilled in the art, that one or more processes, sub-processes, or process steps described in connection with FIG. 11 may be performed by hardware and/or software (machine readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for middleware service for integrated building server that communicates directly with equipment, panels, and points has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for a multiple services for integrated building (MSIB) system to access data in elements of building automation system (BAS), comprising:
   executing a virtual node hosting environment by a controller;
   generating at least one virtual node in the virtual node hosting environment for communication with elements of the BAS, where the virtual node hosting environment allocates memory and processor resources to the at least one virtual node;
   configuring a plurality of services for communicating with elements of the BAS where the plurality of services includes starting a plurality of mandatory services with at least a virtual node supervisor and a service supervisor with a polling time and separation timer period that are set in an at least one of the mandatory services;
   collecting data from the elements of the BAS via the configured services; and
   providing the collected data to one or more data consumers.

2. The method for MSIB of claim 1, where providing the collected data to one or more data consumers, includes providing the collected data at a predetermined update interval.

3. The method for MSIB of claim 1, restarting services that fail by the service supervisor.

4. The method for MSIB of claim 1, where creating at least one virtual node, includes verifying licensing of the virtual node for accessing a predetermined number of elements.

5. The method for MSIB of claim 1, where collecting data from elements of the BAS include collecting data from a combination of panels, equipment, and points of a BAS.

6. The method for MSIB of claim 1, wherein providing data to data consumers includes sending data to the data consumers via the internet.

7. The method for MSIB of claim 1, wherein collecting data form elements of the BAS includes collecting data from other elements of a different BAS.

8. A multiple services for integrated building (MSIB) server for accessing at least one BAS, comprising: a memory having a plurality of instructions for a virtual node hosting environment; a controller coupled to the memory executing the instructions for a virtual node hosting environment; a communication interface coupled to the controller that is accessed in response to at least one service in a virtual node to communicate with a plurality of elements of the BAS and a plurality of mandatory services that includes at least a virtual node supervisor and a service supervisor started by the controller, and a polling time and separation timer period that are set in an at least one of the plurality of mandatory services; and a data store coupled to the controller that stores data received in response to the communication with the plurality of elements, where the data is accessible by one or more data consumer.

9. The MSIB server of claim 8, wherein the data is accessible by one or more data consumers at predetermined update intervals.

10. The MSIB server of claim 8, where the service supervisor restarts a service that fails.

11. The MSIB server of claim 8, where creating at least one virtual node, includes a license being verified by the controller that limits the number elements that may be accessed.

12. The MSIB server of claim 8, wherein the elements of the BAS include panels, equipment, and points that are accessed by the communication interface.

13. A non-transient machine readable media having a plurality of instructions for a multiple services for integrated building (MSIB) system, that when executed perform the method steps of:
   executing a virtual node hosting environment by a controller;
   creating at least one virtual node in the virtual node hosting environment for communication with elements of the BAS, where the virtual node hosting environment allocates memory and processor resources to the at least one virtual node;
   configuring a plurality of services for communicating with elements of the BAS that include starting a plurality of mandatory services including a virtual node supervisory and a service supervisor, where the service supervisor restarts at least one service that failed;
   collecting data from the elements of the BAS via the configured services; and
   providing the collected data to one or more data consumers.

14. The plurality of instructions of claim 13, where the plurality of instructions for creating at least one virtual node, includes instructions for verifying licensing of the virtual node and limits the number of elements that are accessed.

15. The plurality of instructions of claim 13, wherein the plurality of instructions for the collecting data from elements of the BAS includes accessing other panels, equipment, and points of a different BAS.

* * * * *